US012537287B2

(12) United States Patent
Xu et al.

(10) Patent No.: US 12,537,287 B2

(45) Date of Patent: Jan. 27, 2026

(54) ELECTRONIC DEVICE

(71) Applicant: Lenovo (Beijing) Limited, Beijing (CN)

(72) Inventors: Yuling Xu, Beijing (CN); Dafei Mo, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 164 days.

(21) Appl. No.: 18/233,786

(22) Filed: Aug. 14, 2023

(65) Prior Publication Data

US 2024/0113412 A1 Apr. 4, 2024

(30) Foreign Application Priority Data

Sep. 30, 2022 (CN) ........................ 202211215268.8

(51) Int. Cl.

*H01Q 1/48* (2006.01)
*H01Q 1/22* (2006.01)
*H01Q 9/04* (2006.01)

(52) U.S. Cl.

CPC ............. *H01Q 1/2266* (2013.01); *H01Q 1/48* (2013.01); *H01Q 9/0407* (2013.01)

(58) Field of Classification Search

CPC .......... H01Q 1/22; H01Q 1/2266; H01Q 1/48; H01Q 9/0407

See application file for complete search history.

(56) References Cited

FOREIGN PATENT DOCUMENTS

| | | | | |
|---|---|---|---|---|
| CN | 109244645 A | * | 1/2019 | ............ H01Q 1/243 |
| CN | 113488773 A | * | 10/2021 | ............... H01Q 1/48 |
| CN | 117458122 A | * | 1/2024 | |

* cited by examiner

*Primary Examiner* — Jimmy T Vu

(74) *Attorney, Agent, or Firm* — ANOVA LAW GROUP, PLLC

(57) ABSTRACT

An electronic device includes a first body, a second body, and a first antenna. The first body and the second body are configured to bend relatively. A periphery of the first body includes a first conductive frame, and a periphery of the second body includes a second conductive frame. The first conductive frame includes a first gap. The first antenna is arranged in the first body. A feeding end of the first antenna is connected to the first conductive frame. The first antenna includes a first working mode and a second working mode. In the first working mode, the first antenna transmits a signal based on the first conductive frame having the first gap. In the second working mode, the first antenna transmits the signal based on the first conductive frame and the second conductive frame.

10 Claims, 7 Drawing Sheets

ELECTRONIC DEVICE

CROSS-REFERENCE TO RELATED APPLICATION

The present disclosure claims priority to Chinese Patent Application No. 202211215268.8, filed on Sep. 30, 2022, the entire content of which is incorporated herein by reference.

TECHNICAL FIELD

The present disclosure relates to the electronic device technology field and, more particularly, to an electronic device having an antenna.

BACKGROUND

With the continuous development of science and technology, more electronic devices with wireless communication capabilities are widely used, which brings convenience. Electronic devices become important tools.

A main component for implementing the wireless communication capability in an electronic device is an antenna. As more functions are integrated into the electronic device, the internal space of the electronic device becomes crowded and does not satisfy an antenna performance need. Thus, antenna communication performance is affected.

SUMMARY

Embodiments of the present disclosure provide an electronic device, including a first body, a second body, and a first antenna. The first body and the second body are configured to bend relatively. A periphery of the first body includes a first conductive frame, and a periphery of the second body includes a second conductive frame. The first conductive frame includes a first gap. The first antenna is arranged in the first body. A feeding end of the first antenna is connected to the first conductive frame. The first antenna includes a first working mode and a second working mode. In the first working mode, the first antenna transmits a signal based on the first conductive frame having the first gap. In the second working mode, the first antenna transmits the signal based on the first conductive frame and the second conductive frame.

DETAILED DESCRIPTION OF THE EMBODIMENTS

Embodiments of the present disclosure are described in detail below in connection with the accompanying drawings. Described embodiments are merely some embodiments of the present disclosure not all embodiments. Based on embodiments of the present disclosure, all other embodiments obtained by those of ordinary skill in the art without creative effort are within the scope of the present disclosure.

Currently, a full-screen or a curved screen is a main development trend for an electronic device. However, the design of the full-screen or the curved screen of the electronic device contradicts the requirement of using non-metal materials around an antenna for better radiation performance.

A conventional antenna requires a clearance space of 4 mm-5 mm reserved outside of the display screen for placing the antenna. If the antenna is arranged on the back of or directly underneath the display screen without a clearance space, the performance and field shape of the antenna can be limited and impacted. Thus, it is challenging to design the antenna in a mobile terminal product with a high screen-to-body ratio.

Furthermore, for electronic devices with appearance requirements, such as full-screen, curved screen, or foldable full-screen, the antenna cannot be arranged in a rotating connection structure of the electronic device. The antenna is usually arranged in two shell bodies of the electronic device that can be rotated or folded. A metal environment in the shell of the electronic device can affect the communication performance of the electronic device.

To address the above issues, the present disclosure provides an electronic device. A first antenna can be arranged in a first body. A feeding end of the first antenna can be connected to a first conductive frame of the first body. Thus, the first antenna can use the first conductive frame with a first gap to transmit a signal in a first working mode. The first antenna can use the first conductive frame and a second conductive frame to transmit a signal in a second working mode. Thus, the first antenna can use the conductive frame of the electronic device to transmit a signal to improve the communication performance of the antenna. Based on the working mode, the first antenna can use the first conductive frame or the first conductive frame and the second conductive frame to transmit a signal. Therefore, when the electronic device is under different postures, the first antenna can have good communication performance.

To make the above objectives, features, and advantages of the present disclosure more apparent and easy to understand, the present disclosure can be further described in detail in connection with the accompanying drawings and embodiments of the present disclosure.

Figure 1:
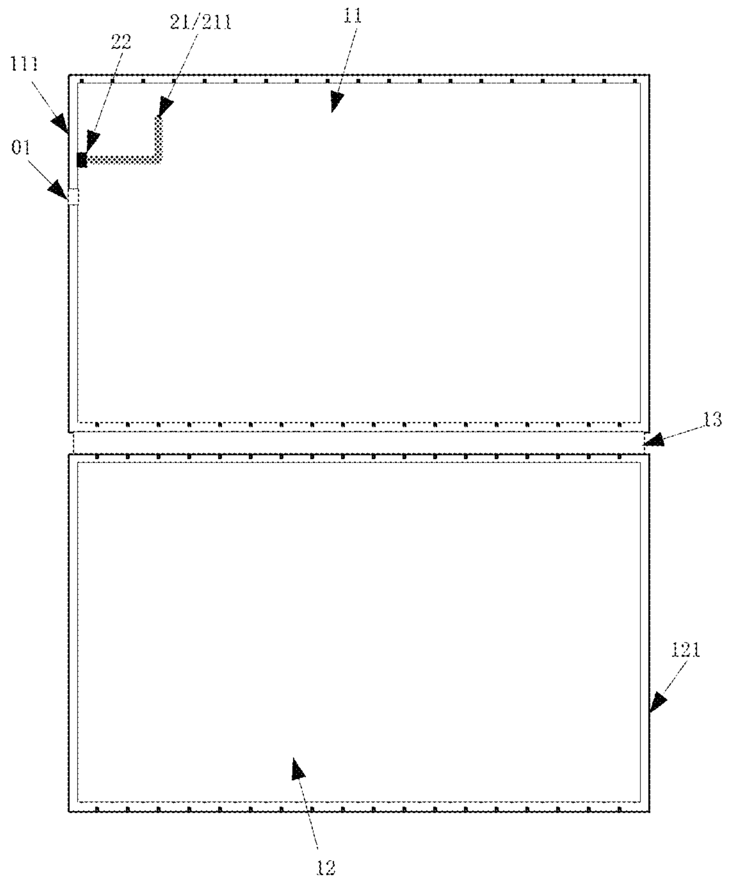
FIG. 1 illustrates a schematic structural diagram of an electronic device when a first antenna is in a first working mode according to some embodiments of the present disclosure.
Figure 2:
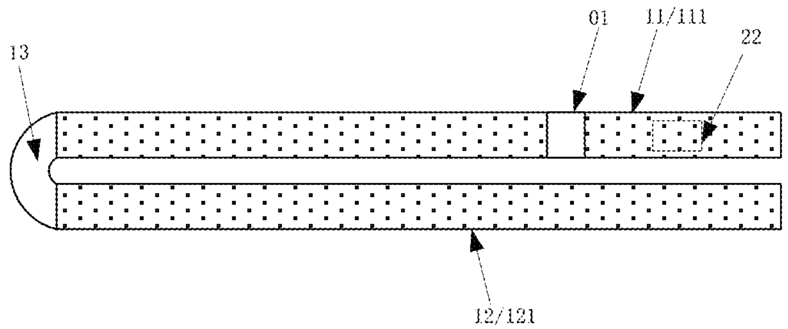
FIG. 2 illustrates a schematic structural diagram of an electronic device when a first antenna is in a second working mode according to some embodiments of the present disclosure.

FIG. 1 illustrates a schematic structural diagram of an electronic device when a first antenna is in a first working mode according to some embodiments of the present disclosure. FIG. 2 illustrates a schematic structural diagram of the electronic device when the first antenna is in a second working mode according to some embodiments of the present disclosure. The electronic device includes a first body 11, a second body 12, and a first antenna 21.

The first body 11 and the second body 12 can be folded relative to each other. A periphery of the first body 11 includes a first conductive frame 111. A periphery of the second body 12 includes a second conductive frame 121. The first conductive frame 111 includes a first gap 01.

The first antenna 21 is arranged in the first body 11. A feeding end 22 of the first antenna 21 is connected to the first conductive frame 111.

In embodiments of the present disclosure, the first antenna 21 can have a first working mode and a second working mode. In the first working mode, the first antenna 21 can transmit a signal based on the first conductive frame 111 with the first gap 01. In the second working mode, the first antenna 21 can transmit a signal based on the first conductive frame 111 and the second conductive frame 121.

In the electronic device, the first antenna 21 can be arranged in the first body 11, and the feeding end 22 of the first antenna 21 can be connected to the first conductive frame 111 of the first body 11. Thus, in the first working mode, the first antenna 21 can use the first conductive frame 111 with the first gap 01 to transmit the signal. In the second working mode, the first antenna 21 can use the first conductive frame 111 and the second conductive frame 121 to transmit the signal. Thus, the first antenna 21 can use the conductive frame of the electronic device to transmit the signal to improve the communication performance of the antenna. Moreover, based on the working mode, the first antenna 21 can use the first conductive frame 111 or the first conductive frame 111 and the second conductive frame 121 to transmit the signal to cause the first antenna 21 to have good communication performance when the electronic device is under different postures.

The first gap 01 can be configured to disconnect the first conductive frame 111. When the first antenna 21 is in the first working mode, the first conductive frame 111 having the first gap connected to the first antenna 21 based on the feeding end 22 can transmit the signal. When the first antenna 21 is in the second working mode, the first conductive frame 111 having the first gap connected to the first antenna 21 based on the feeding end 22 and the second conductive frame 121 coupled with the first conductive frame can transmit the signal.

In the first working mode, as shown in FIG. 1, the relative positions of the first body 11 and the second body 12 do not satisfy a position relationship. The first conductive frame 111 and the second conductive frame 121 do not satisfy a coupling relationship. Thus, the second conductive frame 121 can have no or negligible influence on the signal transmission of the first antenna 21. The first antenna 21 can transmit the signal based on the first conductive frame 111.

In the second working mode, as shown in FIG. 2, the relative positions of the first body 11 and the second body 12 satisfy the position relationship. The first conductive frame 111 and the second conductive frame 121 satisfy the coupling relationship. Thus, the second conductive frame 121 can be coupled with the first conductive frame 111 to allow the first antenna 21 to transmit the signal based on the first conductive frame 111 and the second conductive frame 121.

Based on the above description, in the electronic device of embodiments of the present disclosure, if the relative positions of the first body 11 and the second body 12 do not satisfy the position relationship, and the first conductive frame 111 and the second conductive frame 121 do not satisfy the coupling condition, the first antenna 21 can be in the first working mode. If the relative positions of the first body 11 and the second body 12 satisfy the position relationship, and the first conductive frame 111 and the second conductive frame 121 satisfy the coupling condition, the first antenna 21 can be in the second working mode.

A connection member 13 can be arranged between the first body 11 and the second body 12. The connection member 13 can be configured to allow the first body 11 and the second body 12 to bend relative to each other. The connection member 13 can be a flexible structure, e.g., a part of the flexible screen, which can bend. In some other embodiments, the connection member 13 can also be a mechanical rotation structure, e.g., a shaft or a hinge.

In embodiments of the present disclosure, whether the first body 11 and the second body 12 satisfy the position relationship can be determined based on a distance between determined positions corresponding to the first body 11 and the second body 12. If the distance is greater than a predetermined distance threshold, the first body 11 and the second body 12 may not satisfy the position relationship. Otherwise, the first body 11 and the second body 12 may satisfy the predetermined relationship. If the distance is smaller than the predetermined distance threshold, a coupling gap that is able to be coupled to the transmission signal of the antenna can be formed between the first conductive frame 111 and the second conductive frame 121 to cause the first conductive frame 111 to be coupled to the second conductive frame 121. In the second working mode, the first antenna 21 can transmit the signals based on the first conductive frame 111 and the second conductive frame 121 to improve the performance of the first antenna 21. When the distance is not smaller than the predetermined distance threshold, the coupling gap that is coupled to the transmission signal of the antenna cannot be formed between the first conductive frame 111 and the second conductive frame 121. In the first working mode, the first antenna 21 can transmit the signal based on the first conductive frame 111.

The determined position of the first body 11 can be a free end of the first body 11. The determined position of the second body 12 can be a free end of the second body 12. The free end of the first body 11 can be an end of the first body 11 away from the connection member 13. The free end of the second body 12 can be an end of the second body 12 away from the connection member 13. A distance between the free end of the first body 11 and the free end of the second body 12 can be set to be greater than the predetermined distance threshold. Then, the determined positions of the first body 11 and the second body 12 may not satisfy the position relationship. The distance threshold can be determined based on the size of the electronic device and the position of the determined position in the body. For example, the predetermined distance threshold can be set to be not smaller than 30 mm.

Whether the determined positions of the first body 11 and the second body 12 satisfy the position relationship can be determined through the distance between the determined positions of the first body 11 and the second body 12. When the first antenna 21 is in the first working mode, the posture of the electronic device may not be limited to the first body 11 and the second body 12 being in an unfolded state shown in FIG. 1. When the distance between the determined positions of the first body 11 and the second body 12 is greater than the predetermined distance threshold, the first antenna 21 can be in the first working mode for any postures corresponding to the electronic device. Similarly, when the first antenna 21 is in the second working mode, the posture of the electronic device is not limited to the first body 11 and the second body 12 being in the folded state and in parallel to each other. When the distance between the determined positions of the first body 11 and the second body 12 is not greater than the predetermined distance threshold, the first antenna 21 can be in the second working mode for any postures corresponding to the electronic device.

A distance sensor can be integrated into the first body 11 or the second body 12 to detect the distance between the determined positions of the first body 11 and the second body 12, which is used to determine whether the first body 11 and the second body 12 satisfy the position relationship.

Whether the first body 11 and the second body 12 satisfy the position relationship can be determined based on the distance information. The determined position is not limited to the free ends of the first body 11 and the second body 12. Whether the first body 11 and the second body 12 satisfy the position relationship can also be determined based on the distance between other positions of the first body 11 and the second body 12. For example, whether the first body 11 and the second body 12 satisfy the position relationship can be determined based on the distance between a middle point at a left short edge of the first conductive frame 111 and a middle point at a left short edge of the second conductive frame 121.

Furthermore, whether the first body 11 and the second body 12 satisfy the position relationship can be determined based on the angle between the first body 11 and the second body 12. If the angle is in the determined angle range, the first body 11 and the second body 12 may not satisfy the position relationship. Otherwise, the first body 11 and the second body 12 can satisfy the predetermined relationship. The determined angle range can be (A1, A2). A1 and A2 can be determined angle values. A1 is smaller than A2 and greater than 0°. A2 is smaller than 360°. If a belongs to (A1, A2), the first body 11 and the second body 12 may not satisfy the position relationship. If a does not belong to (A1, A2), the first body 11 and the second body 12 can satisfy the position relationship.

When a does not belong to (A1, A2), a can be greater than and equal to 0° and smaller than and equal to A1, or a can be greater than and equal to A2 and smaller than and equal to 360°. Then, a coupling gap that is coupled to the transmission signal of the antenna can be formed between the first conductive frame 111 and the second conductive frame 121. Thus, the first conductive frame 111 can be coupled to the second conductive frame 121. Then, the first antenna 21 can be in the second working mode. The first antenna 21 can transmit the signal based on the first conductive frame 111 and the second conductive frame 121 to improve the performance of the first antenna 21. When a belongs to (A1, A2), a is greater than A1 and smaller than A2. The coupling gap that is coupled to the transmission signal of the antenna cannot be formed between the first conductive frame 111 and the second conductive frame 121. The first antenna 21 can be in the first working mode, the first antenna 21 can transmit the signal based on the first conductive frame 111.

An angle sensor can be integrated into the first body 11 or the second body 12. The angle sensor can be configured to detect the angle between the first body 11 and the second body 12, which can be used to determine whether the first body 11 and the second body 12 satisfy the position relationship.

Figure 3:
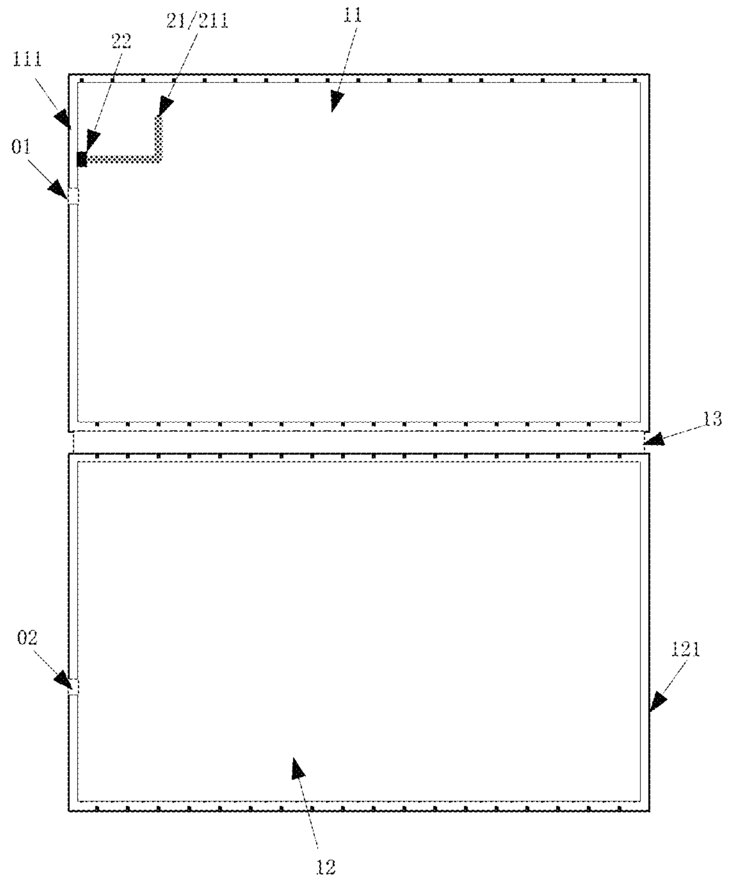
FIG. 3 illustrates a schematic structural diagram of another electronic device when a first antenna is in a first working mode according to some embodiments of the present disclosure.
Figure 4:
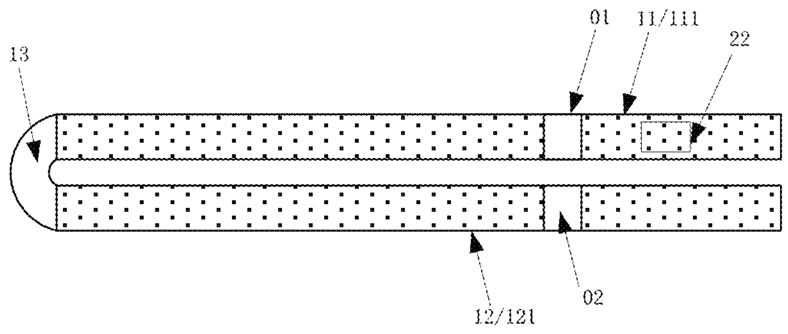
FIG. 4 illustrates a schematic structural diagram of another electronic device when a first antenna is in a second working mode according to some embodiments of the present disclosure.

FIG. 3 illustrates a schematic structural diagram of another electronic device when the first antenna is in the first working mode according to some embodiments of the present disclosure. FIG. 4 illustrates a schematic structural diagram of another electronic device when the first antenna is in the second working mode according to some embodiments of the present disclosure. Similar to FIG. 1, FIG. 3 is a top view of the electronic device when the first antenna 21 is in the first working mode. Similar to FIG. 2, FIG. 4 is a side view of a side of the electronic device corresponding to the first antenna 21 when the first antenna 21 is in the second working mode. A difference between the FIGS. 3 and 4 and FIGS. 1 and 2 includes that the second conductive frame 121 includes a second gap 02.

Similar to FIG. 1, as shown in FIG. 3, when the first antenna 21 is in the first working mode, the first antenna 21 transmits the signal based on the first conductive frame 111 having the first gap 01 connected to the feeding end 22. Then, although the second conductive frame 121 includes the second gap 02, since the second conductive frame 121 and the first conductive frame 111 do not satisfy the coupling condition, the second gap 02 may not impact the transmission signal of the first antenna 21.

Different from FIG. 2, as shown in FIG. 4, when the first antenna 21 is in the second working mode, the first antenna 21 transmits the signal based on the first conductive frame 111 having the first gap 01 and the second conductive frame 121 having the second gap 02. Then, the first conductive frame 111 and the second conductive frame 121 can satisfy the coupling condition, the first antenna 21 can transmit the signal based on the first conductive frame 111 having the first gap 01 connected to the feeding end 22 and the second conductive frame 121 having the second gap 02.

As shown in FIG. 4, the first antenna 21 is in the second working mode, and the first conductive frame 111 and the second conductive frame 121 satisfy the coupling condition. The second gap 02 of the second conductive frame 121 can be used to change the metal environment of the first antenna in the second working mode. Thus, the performance of the first antenna 21 can be adjusted in the second working mode.

As shown in FIG. 3, the electronic device can be unfolded, and the first gap 01 and the second gap 02 are symmetrical. In some other embodiments, the first gap 01 and the second gap 02 may not be symmetrical when the electronic device is unfolded. In embodiments of the present disclosure, positions corresponding to the first gap 01 and the second gap 02 are not limited. The position of the first gap 01 at the first conductive frame 111 and the position of the second gap 02 at the second conductive frame 121 can be adjusted as needed. Thus, the first antenna 21 can have good antenna performance in the first working mode and the in the second working mode.

To maintain the integrity of the appearance of the electronic device, an insulation material can be filled in the first gap 01. Similarly, when the second gap 02 exists, to maintain the integrity of the appearance of the electronic device, the insulation material can be filled in the second gap 02.

In embodiments of the present disclosure, as shown in FIG. 1 to FIG. 4, the same first antenna 21 corresponds to one first gap 01 arranged at the first conductive frame 111.

In some other embodiments, the first antenna 21 can correspond to two first gaps 01 arranged at the first conductive frame 111. The feeding end 22 of the first antenna 21 can be connected to the first conductive frame 111 between the two corresponding first gaps 01. The two first gaps 01 corresponding to the first antenna 21 can be arranged on a same side or two neighboring sides of the first conductive frame 111. When the first antenna 21 corresponds to the two first gaps 01, if a second gap 02 is arranged at the second conductive frame 121, one or more second gaps 02 can be included.

As shown in FIG. 1 and FIG. 3, the first antenna 21 includes a microstrip line 211. The shape of the microstrip line 211 is not limited to the L-shape shown in FIG. 1 and FIG. 3. The shape of the microstrip line 211 can be a T-shape or a straight shape. The shape of the microstrip line 211 is not limited in embodiments of the present disclosure. An end of the microstrip line 211 is connected to the feeding end 22, and the other end is floating to cause an open circuit, which can be used to increase the electrical length of the first antenna 21. Thus, stronger radiation performance can be realized in a limited wiring space.

Figure 5:
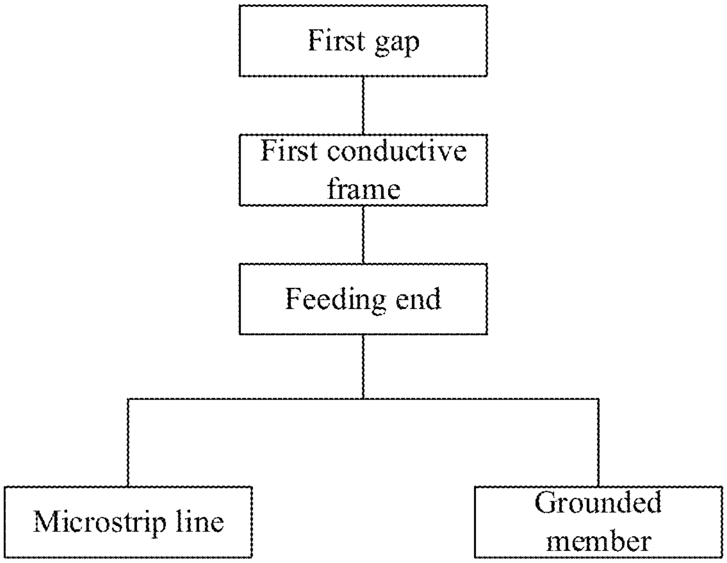
FIG. 5 illustrates a schematic diagram of an antenna system when a first antenna of an electronic device is in a first working mode according to some embodiments of the present disclosure.

Corresponding to FIG. 1 and FIG. 2, when the first antenna 21 is in the first working mode, an equivalent antenna system of the electronic device is shown in FIG. 5.

FIG. 5 illustrates a schematic diagram of the antenna system when the first antenna of the electronic device is in the first working mode according to some embodiments of the present disclosure. In connection with FIG. 1, FIG. 2, and FIG. 5, the first antenna 21 is in the first working mode. The microstrip line 211 can be connected to the first conductive frame 111 through the feeding end 22 and can be connected to a grounded member of the first body 11. The grounded member of the first body 11 can include a metal ground of a circuit board 33 of the first body 11.

Figure 6:
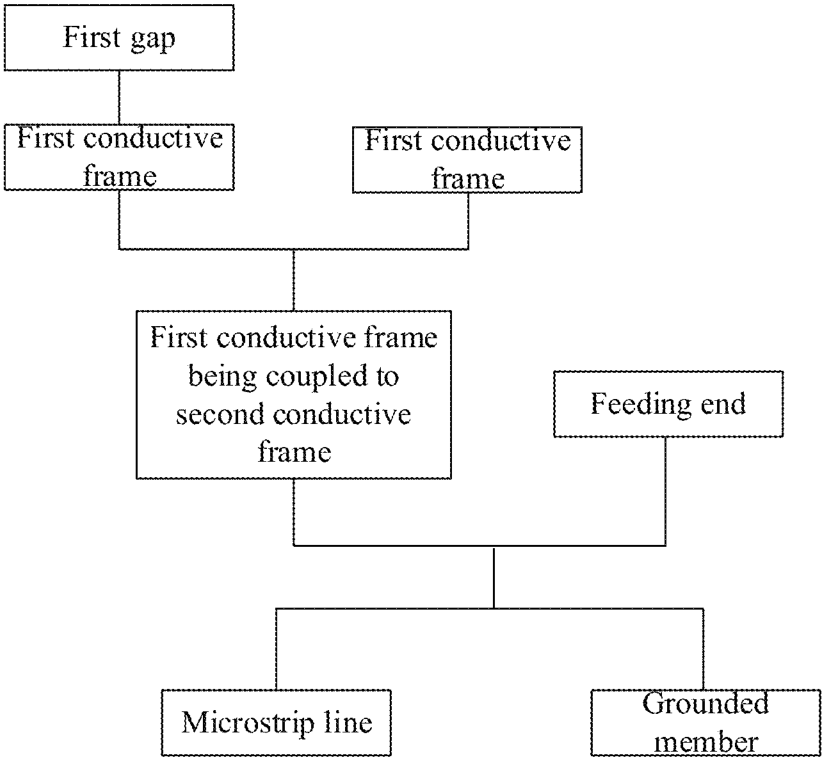
FIG. 6 illustrates a schematic diagram of an antenna system when a first antenna of an electronic device is in a second working mode according to some embodiments of the present disclosure.

Corresponding to FIG. 1 and FIG. 2, when the first antenna 21 is in the second working mode, the equivalent antenna system of the electronic device is shown in FIG. 6.

FIG. 6 illustrates a schematic diagram of the antenna system when the first antenna of the electronic device is in the second working mode according to some embodiments of the present disclosure. In connection with FIG. 1, FIG. 2, and FIG. 6, the first antenna 21 is in the second working mode. The microstrip line 211 of the first antenna 21 is connected to the first conductive frame 111 through the feeding end 22 and is also connected to the grounded member of the first body 11. Because of the relative position between the first body 11 and the second body 12, a coupling gap exists between the first conductive frame 111 and the second conductive frame 121. Thus, when the relative positions of the first body 11 and the second body 12 satisfy the position relationship, the first conductive frame 111 and the second conductive frame 121 satisfy the coupling condition.

As shown in FIG. 3 and FIG. 4, when the first antenna 21 is in the first working mode, the equivalent antenna system of the electronic device is the same as the configurations shown in FIG. 1, FIG. 2, and FIG. 5, which are not repeated here.

Figure 7:
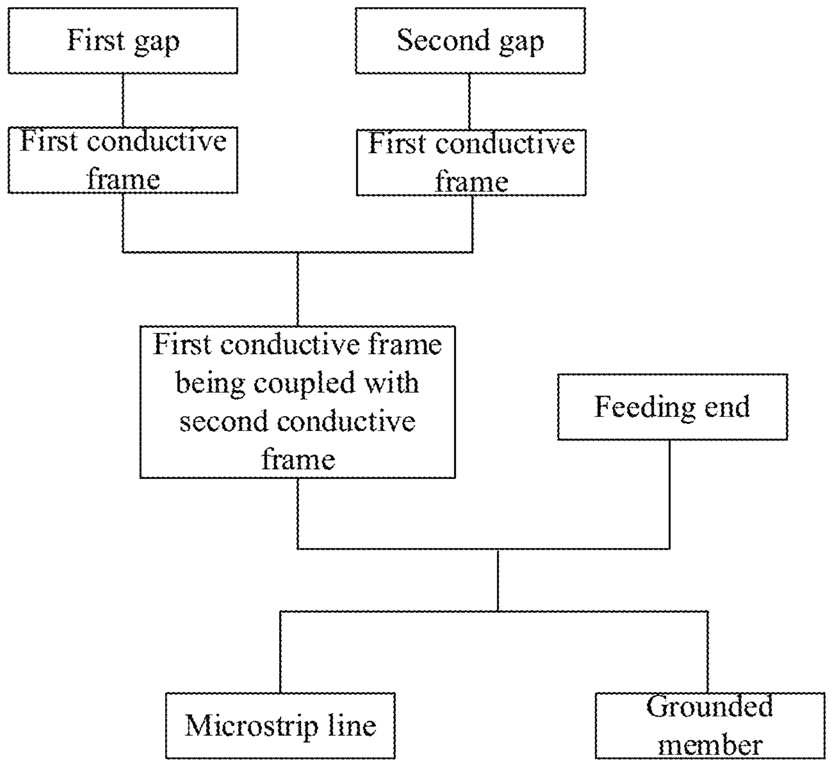
FIG. 7 illustrates a schematic diagram of an antenna system when a first antenna of another electronic device is in a second working mode according to some embodiments of the present disclosure.

As shown in FIG. 3 and FIG. 4, when the first antenna 21 is in the second working mode, the equivalent antenna system of the electronic device is shown in FIG. 7.

FIG. 7 illustrates a schematic diagram of the antenna system when the first antenna of another electronic device is in the second working mode according to some embodiments of the present disclosure. In connection with FIG. 3, FIG. 4, and FIG. 7, the second conductive frame 121 includes the second gap 02. When the first antenna 21 is in the second working mode, the microstrip line 211 can be connected to the first conductive frame 111 through the feeding end 22 and can be also connected to the grounded member of the first body 11. Because of the relative positions between the first body 11 and the second body 12, a coupling gap exists between the first conductive frame 111 and the second conductive frame 121 having the second gap 02.

The difference between the antenna system shown in FIG. 7 and the antenna system shown in FIG. 6 includes that since the second gap 02 is added in the second conductive frame 121 in FIG. 7 when the first antenna 21 is in the second working mode, the metal environment of the first conductive frame 111 and the second conductive frame 121 may change, which has a different coupling performance for the signal. Thus, the performance parameters of the antenna system can be different.

Figure 8:
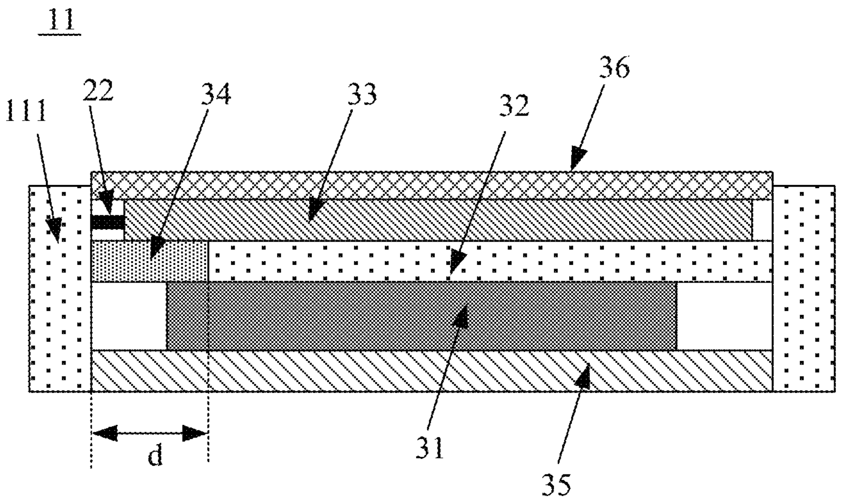
FIG. 8 illustrates a schematic cross-section diagram of a first body of an electronic device according to some embodiments of the present disclosure.

FIG. 8 illustrates a schematic cross-section diagram of the first body of the electronic device according to some embodiments of the present disclosure. FIG. 8 is a cross-section diagram showing the cross-section perpendicular to the left and right side edges of the first body 11 of the electronic device shown in FIG. 1 and FIG. 3. The cross-section passes through the feeding end 22.

In connection with FIG. 1, FIG. 3, and FIG. 8, the first body 11 includes a display assembly 31, a metal frame 32 arranged on a side away from a display side of the display assembly 31, and a circuit board 33 arranged on a side of the metal frame 32 away from the display assembly 31. The first antenna 21 is arranged on the circuit board 33 and includes a microstrip line 211 and an antenna circuit connected to the microstrip line 211. A grounded end of the antenna circuit is connected to the metal ground in the circuit board 33. The metal ground is connected to the metal frame 33.

The antenna circuit and the microstrip line 211 can be arranged on the circuit board 33. The circuit board 33 can be a printed circuit board (PCB). The antenna circuit is not shown in the accompanying drawings of embodiments of the present disclosure. The antenna circuit can be a conventional antenna circuit, which is not repeated here.

In some embodiments, the feeding end 22 can be arranged on a side surface of the circuit board 33 facing the first conductive frame 111 connected or a front side of the circuit board 33 facing the display assembly 31. The feeding end 22 can be connected to the first conductive frame 111 through a clip or pin. The feeding end 22 can be configured to feed a radio frequency (RF) signal and can be connected to the first conductive frame 111 having the first gap 01. The antenna circuit can be connected to the feeding end 22 through a feed wire to be further connected to the microstrip line 211.

The first antenna 21 can include an antenna body connected to the microstrip line 211. The microstrip line 211 can extend the electrical length of the first antenna 21 and can be coupled to mid-to-high frequencies. Thus, the first antenna 21 can cover a full frequency band of WLAN. The antenna body can be a metal structure prepared by laser direct structuring (LDS) technology or FPC. The antenna body and the microstrip line 211 can be arranged on the back of the circuit board 33 away from the display assembly 31 to increase a net distance from the display assembly 31.

In embodiments of the present disclosure, the first conductive frame 111 and the metal frame 32 can have an integrated or separated structure.

In some embodiments, the first body 11 can include a touch assembly 35 arranged on the display side of the display assembly 31. The metal ground in the circuit board 33 can have a hollowed area opposite to the microstrip line 211. Distance d can exist between the metal frame 32 and the side wall of the first conductive frame 111 connected to the feeding end 22. The hollowed area of the metal ground opposite to the microstrip line 211 can cause the area of the metal ground in the circuit board 33 opposite to the microstrip line 211 to form a net space area. To ensure the metal frame 33 is flat, an insulation dielectric 34 can be filled in the gap d. The insulation dielectric 34 can be plastic. In some other embodiments, gap d can be an empty gap.

Distance d can exist between the metal frame 32 and the side wall of the first conductive frame 111 connected to the feeding end 22, which can cause the area of the metal frame 32 opposite to the microstrip line 211 to form the net space area. Thus, the net space distance of the first antenna 21 facing a side of the touch assembly 35 can be increased. The touch assembly 35 can be used as a reference ground for the first antenna 21.

In embodiments of the present disclosure, the feeding end 22 of the first antenna 21 can be connected to the first conductive frame 111 having the first gap 01. The first conductive frame 111 can be used as a radiating element of the first antenna 21 to improve the performance of the first antenna 21. In addition, the area of the metal ground of the circuit board 33 opposite the microstrip line 211 can be hollowed. Distance d can exist between the metal frame 32 and the sidewall of the first conductive frame 111 connected to the feeding end 22. Thus, the reference ground of the first antenna 21 can be changed. Then, the first antenna 21 can be away from the metal structures such as the metal ground and the metal frame 32 to increase the net space. In the device structure, the touch assembly 35 can be used as the reference ground of the first antenna 21, which can greatly improve the performance of the first antenna 21.

In embodiments of the present disclosure, the first antenna 21 can include the microstrip line 211 of the circuit board 33. On one hand, based on the coupling between the microstrip line 211 and the first gap 01, the electrical length of the first antenna 21 can be increased. On another hand, the microstrip line 211 can be coupled with other microstrip lines. In the first working mode, the microstrip line 211 can be coupled with the first gap 01 to generate a part of the mid-to-high frequencies. In the second working mode, based on the opposite position relationship of the two conductive frames, the microstrip line 211 and the electrical frames can generate new couplings to increase interference resistance. In the second working mode, based on the coupling between the microstrip line 211 and the first conductive frame 111, the interference of the second conductive frame 211 can be avoided on the first antenna 21.

Figure 9:
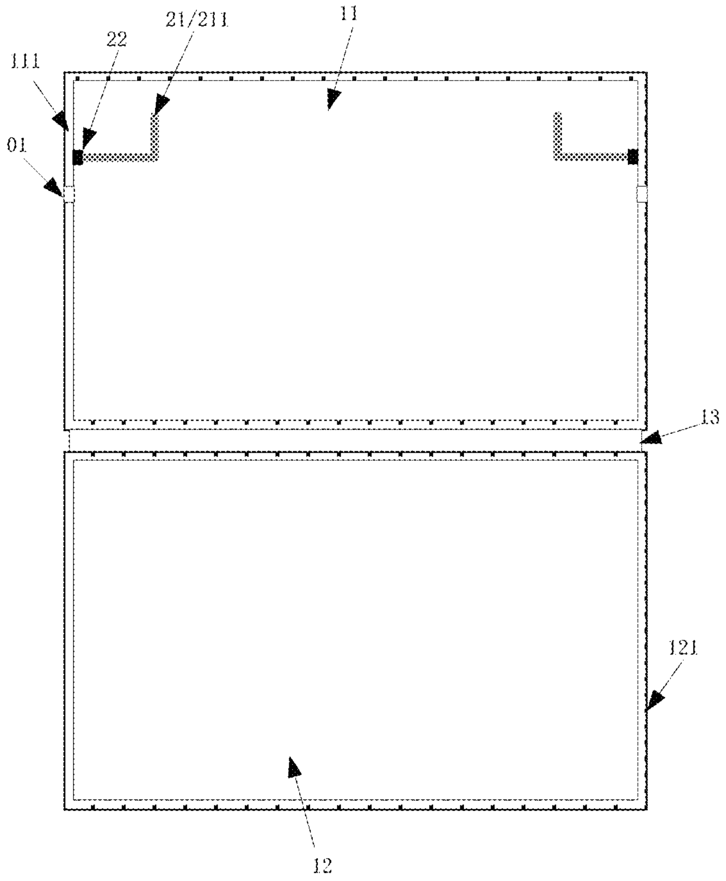
FIG. 9 illustrates a schematic structural diagram of still another electronic device when a first antenna is in a first working mode according to some embodiments of the present disclosure.
Figure 10:
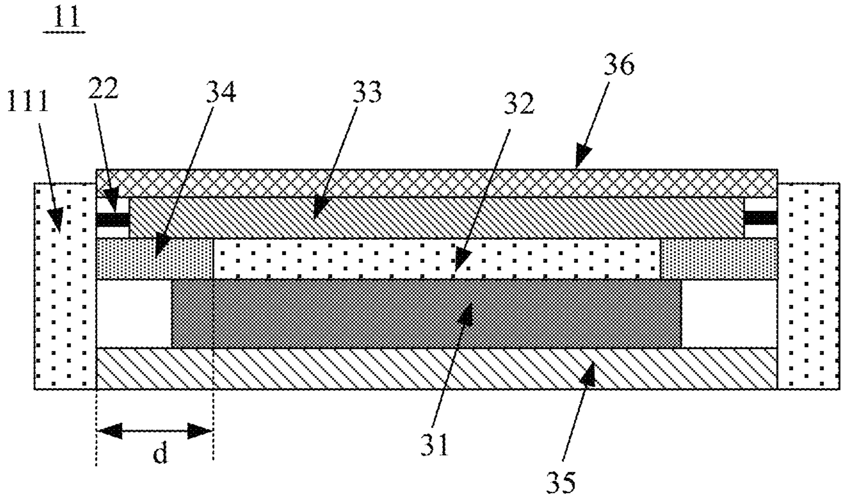
FIG. 10 illustrates a schematic cross-section diagram of a first body of the electronic device in FIG. 9.

FIG. 9 illustrates a schematic structural diagram of still another electronic device when the first antenna is in the first working mode according to some embodiments of the present disclosure. FIG. 10 illustrates a schematic cross-section diagram of the first body of the electronic device in FIG. 9. The cross-section in FIG. 10 is perpendicular to the left and right side edges of the first body 11 of the electronic device shown in FIG. 9. The cross-section passes through two feeding ends 22 of the first antenna 21. Thus, the first body 11 can include two first antennas 21, which can be used as a main antenna and an auxiliary antenna of a same type. The feeding ends 22 corresponding to the two first antennas 21 are arranged on the first conductive frame 111 opposite to the same side edge of the first body 11. The two feeding ends 22 are symmetrical about a center line of the side edge. When the first antenna 21 is in the second working mode, the posture of the electronic device and the coupling methods of the first conductive frame 111 and the second conductive frame 121 can be similar to above, which are not repeated here.

For example, as shown in FIG. 9, the two first antennas 21 are on the left first conductive frame 111 and the right first conductive frame 111 opposite to the upper side edge of the first body, respectively. The feeding ends 22 of the two first antennas 21 can be symmetrical around the center line of the upper side edge of the first body 11. A pattern structure of the two first antennas 21 can be symmetrical or asymmetrical around the center line.

When the two first antennas 21 are included, the feeding ends 22 of the two first antennas 21 can be arranged on the first conductive frame 111 corresponding to the side edge of the first body 11 away from the connection member 13. Thus, the two feeding ends 22 can be also symmetrical about the center line of the side edge.

In embodiments of the present disclosure, when the two first antennas 21 are included, the feeding ends 22 of the two first antennas 21 can be arranged based on specific requirements. The feeding ends 22 of the two first antennas 21 can be symmetrically arranged on two opposite sidewalls of the first conductive frame 111, i.e., the left and right sidewalls of the first conductive frame 111 shown in FIG. 9. The two sidewalls can be arranged on two opposite sides of the connection member 13. In some other embodiments, the feeding ends 22 of the two first antennas 21 can be symmetrically arranged on the same sidewall of the first conductive frame 111 away from the connection member 13, i.e., the upper sidewall of the first conductive frame 111 shown in FIG. 9. The arrangement of the feeding ends 22 is not limited in embodiments of the present disclosure. The feeding ends 22 can be arranged based on the actual needs.

As shown in FIG. 9, to cause the first antenna 21 to have different coupling methods in the second working mode, the second conductive frame 121 also includes the second gap 02. For each first antenna 21, one or more second gaps 02 can be arranged at the second conductive frame 121. The second gaps 02 can be arranged similarly as above, which is not repeated here.

Figure 11:
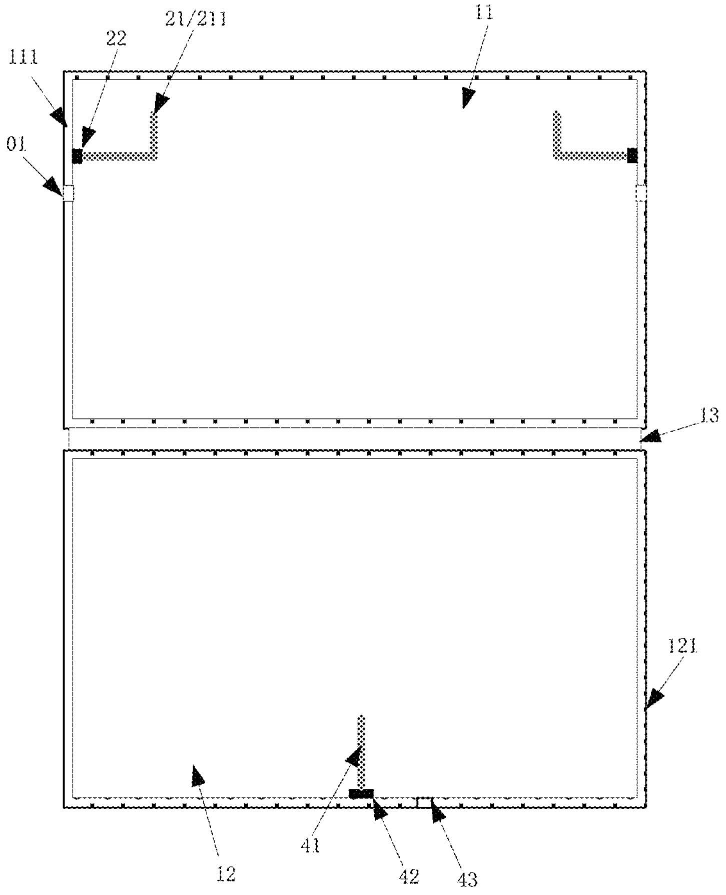
FIG. 11 illustrates a schematic structural diagram of an electronic device having two different types of antennas according to some embodiments of the present disclosure.

FIG. 11 illustrates a schematic structural diagram of the electronic device having two different types of antennas according to some embodiments of the present disclosure. The electronic device in FIG. 11 also includes a second antenna 41. The first antenna 21 and the second antenna 41 can be different types of antennas and have different radiation frequency bands. One of the first antenna 21 and the second antenna 41 can be a WIFI antenna, and the other one of the first antenna 21 and the second antenna 41 can be a WWAN 5G antenna. The antenna types of the first antenna 21 and the second antenna 41 are not limited in embodiments of the present disclosure and are not limited to the antenna types illustrated in the present disclosure.

As shown in FIG. 11, the second antenna 41 is arranged in the second body 12, and the feeding end 22 of the second antenna 41 is connected to the second conductive frame 121. When the first body 11 and the second body 12 satisfy the position relationship, the microstrip line 211 of the first antenna 21 does not overlap with the microstrip line of the second antenna 41 to avoid interference between the two different types of antennas.

Figure 12:
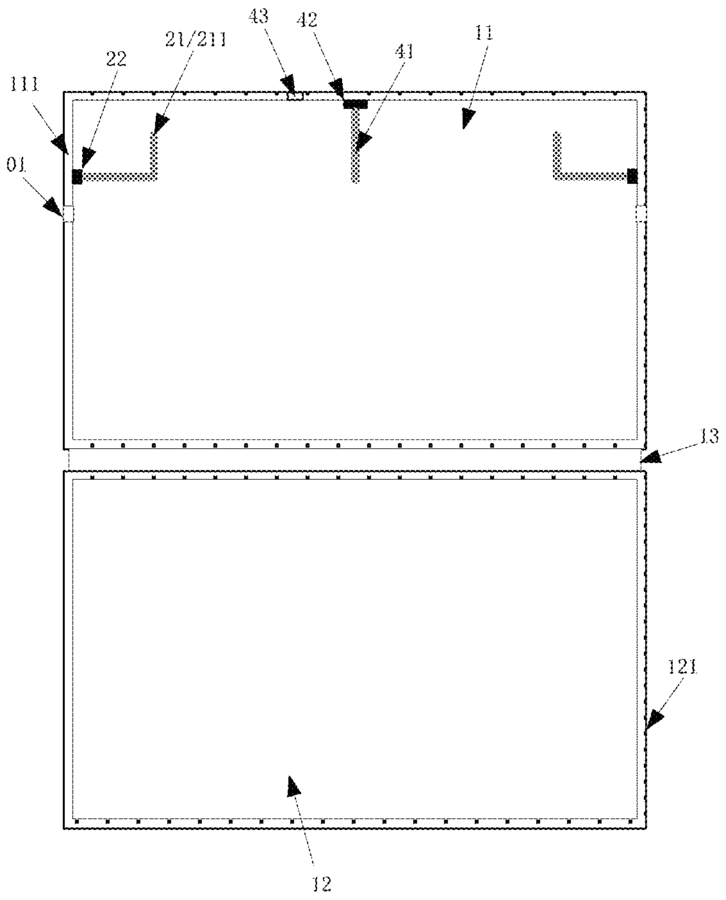
FIG. 12 illustrates a schematic structural diagram of another electronic device having two different types of antennas according to some embodiments of the present disclosure.

FIG. 12 illustrates a schematic structural diagram of another electronic device having two different types of antennas according to some embodiments of the present disclosure. The difference between FIG. 11 and FIG. 12 includes that, in FIG. 12, the second antenna 41 is arranged in the first body 11, and the feeding end 42 of the second antenna 41 is connected to the first conductive frame 111. The feeding end 22 connected to the first antenna 21 and the feeding end 42 connected to the second antenna 41 can be arranged at the first conductive frames 111 corresponding to different side edges of the first body 11.

As shown in FIG. 11 and FIG. 12, when the second antenna 41 is included, the conductive frame connected to the feeding end 42 of the second antenna includes a third gap 43, which is configured to be coupled with the microstrip line of the second antenna 41. The structure of the second antenna 41 can refer to the first antenna 21, which is not repeated here.

In the embodiments of the present disclosure, when two different types of antennas are included in the electronic device, if the two antennas of different types are arranged in the first body 11, the feeding ends of the two different types of antennas can be connected to the first conductive frames 111 corresponding to different side edges of the first body 11.

The electronic device can include the WIFI antenna and the WWAN 5G antenna. In some embodiments, the WIFI antenna can include two first antennas 21. The two first antennas 21 can be used as a main antenna and an auxiliary antenna of the WIFI antenna, respectively. Based on the rectangular first body 11 in FIG. 12, the feeding ends 22 of the two first antennas 21 of the WIFI antenna are connected to the short sidewalls on the left and right sides of the first conductive frame 111. The feeding end of the WWAN 5G antenna is connected to the long sidewall on the upper side of the first conductive frame 111 in FIG. 12. Thus, the performance of the two antennas can be improved, and the interference when the two types of the antennas of different types can be avoided. In some other embodiments, the feeding ends 22 of the two first antennas 21 in the WIFI antenna can be connected to the upper long sidewall of the first conductive frame 111, and the feeding end of the WWAN 5G antenna can be connected to one of the short sidewalls on the left and right sides of the first conductive frame 111.

In embodiments of the present disclosure, the electronic device can be a laptop computer. The first body 11 and the second body 12 can be the display screen body and the keyboard body of the laptop computer, respectively. In some other embodiments, the electronic device can be a flexible display device that is able to bend. The first body and the second body can be bodies with display functions.

Based on the above description, by adopting the technical solution of the first antenna 21 of the present disclosure, the following technical effects can be realized.

First, the reference ground of the first antenna 21 can be changed from the metal backshell 36 of the electronic device to the touch assembly 35 to effectively improve the effective height of the first antenna 21. The metallic backshell 36 can be arranged on a side of the metal frame 33 away from the display assembly 31.

Second, by setting gap d, the distance between the antenna radiation element and the metal frame 32 can be increased, which can significantly improve the efficiency of the first antenna 21.

Third, the first antenna 21 can include the microstrip line 211 of the circuit board 33 and can be mutually coupled to the first gap 01 based on the microstrip line 211. The electrical length of the first antenna 21 can be increased, and the communication bandwidth of the first antenna 21 can be broadened. When the first antenna 21 is in the second working mode, the different position relationships of the two conductive frames can cause the first antenna 21 to generate a different coupling when the first antenna 21 is in the first working mode. A new bandwidth can be generated by the coupling in the second working mode, which can improve the anti-interference capability.

Fourth, through the two first antennas 21 with the feeding ends 22 arranged symmetrically in the first body 11, a multiple-input multiple-output (MIMO) antenna structure (e.g., a 2*2 MIMO antenna) can be implemented, which can enhance the throughput of the antennas at a certain level and make the antenna communication more stable.

Fifth, the gap positions and filling structures of the conductive frame can be designed to cause the electronic device to have an appealing appearance to enhance product competitiveness.

Embodiments of the present disclosure are described in a progressive, parallel, or combined methods. Each embodiment focuses on the difference from other embodiments. The same or similar parts among embodiments can be cross-referenced.

In the description of embodiments of the present disclosure, the description of the drawings and embodiments are illustrative and not restrictive. The same reference numerals represent the same structure throughout the specification. In addition, to facilitate understanding and description, the thicknesses of some layers, films, panels, and areas can be exaggerated in the drawings. Meanwhile, when an element such as a layer, a film, an area, or a substrate is described as on another element, the element can be directly on the another element or an intermediate element can exist. In addition, "on" represents that the element is positioned on the another element or under the another element, which does not indicate that the element is positioned on an upper side of the another element in a gravity direction.

The direction or position relationship indicated by the terms such as "up," "down," "top," "bottom," "inner," "outer," etc., can be the direction or the position relationship shown in the accompanying drawings. The terms are used to facilitate the description of the present disclosure and simplification of description. The terms do not indicate or imply that the device or element must have a specific direction or be constructed and operated in a specific direction, which cannot be considered as a limitation to the present disclosure. When one assembly is considered as being connected to another assembly, the assembly can be directly connected to the another assembly, or an assembly that is arranged therebetween can be provided.

In the specification, terms such as "first" and "second" are used merely to distinguish one entity or operation from another, and do not necessarily imply any actual relationship or order between these entities or operations. Moreover, terms such as "comprising," "including," or any other variation thereof are intended to cover non-exclusive inclusion. Thus, an item or device including a series of elements includes not only those elements explicitly listed but also other elements that are not expressly listed but are inherently included in such an item or device. When there are no more limitations, an element restricted by a phrase "including a . . . " does not exclude the presence of additional identical elements in the item or device including the element.

The above descriptions of embodiments of the present disclosure enable those skilled in the art to implement or use the present disclosure. Modifications to these embodiments can be apparent to those skilled in the art. The general principles defined in the present disclosure can be implemented in other embodiments without departing from the spirit or scope of the present disclosure. Thus, the present disclosure is not limited to embodiments of the present disclosure but conforms to the widest scope consistent with the principles and novel features of the present disclosure.

What is claimed is:

1. An electronic device comprising:

a first body and a second body configured to bend relatively, wherein a periphery of the first body includes a first conductive frame, and a periphery of the second body includes a second conductive frame, and the first conductive frame includes a first gap;

a first antenna arranged in the first body and including a microstrip line, wherein a feeding end of the first antenna is connected to the first conductive frame;

wherein:

the first antenna includes a first working mode and a second working mode;

in the first working mode, the first antenna transmits a signal based on the first conductive frame having the first gap, and the microstrip line is connected to the first conductive frame through the feeding end and is also connected to a grounded member of the first body;

in the second working mode, the first antenna transmits the signal based on the first conductive frame and the second conductive frame.

2. The electronic device according to claim 1, wherein:

when a relative position relationship between the first body and the second body does not satisfy a position relationship, the first conductive frame and the second conductive frame do not satisfy a coupling condition, and the first antenna is in the first working mode; and when the relative position relationship between the first body and the second body satisfies the position relationship, the first conductive frame and the second conductive frame satisfy the coupling condition, and the first antenna is in the second working mode.

3. The electronic device according to claim 1, wherein:

the second conductive frame includes a second gap; and in the second working mode, the first antenna transmits the signal based on the first conductive frame having the first gap and the second conductive frame having the second gap.

4. The electronic device according to claim 1, wherein:

one end of the microstrip line is connected to the feeding end, and the other end of the microstrip line is floating to increase an electrical length of the first antenna.

5. The electronic device according to claim 4, wherein in the second working mode:

the microstrip line is connected to the first conductive frame through the feeding end and is also connected to a grounded member of the first body; and a coupling gap is formed between the first conductive frame and the second conductive frame because of the relative position relationship between the first body and the second body.

6. The electronic device according to claim 4, wherein:

the second conductive frame includes a second gap; and in the second working mode, the microstrip line is connected to the first conductive fram through the feeding end and is also connected to a grounded member of the first body, and a coupling gap is formed between the first conductive frame and the second conductive frame having the second gap because of the relative position relationship between the first body and the second body.

7. The electronic device according to claim 1, wherein:

the first body includes a display assembly, a metal frame away from a display side of the display assembly, and a circuit board arranged on a side of the metal frame away from the display assembly;

the first antenna is arranged at the circuit board;

the first antenna includes a microstrip line and an antenna circuit connected to the microstrip line;

a grounded end of the antenna circuit is connected to a metal ground of the circuit board; and the metal ground is connected to the metal frame.

8. The electronic device according to claim 7, wherein:

the first body further includes a touch assembly arranged on the display side of the display assembly;

an area of the metal ground opposite to the microstrip line is hollowed;

a distance exists between the metal frame and a sidewall of the first conductive frame connected to the feeding end to increase a net space distance of the first antenna facing the touch assembly; and the touch assembly is used as a reference ground for the first antenna.

9. The electronic device according to claim 1, wherein:

the first antenna includes two first antennas used as a main antenna and an auxiliary antenna of a same type;

feeding ends corresponding to the two first antennas are arranged at the first conductive frame opposite to a same side edge of the first body; and the two feeding ends are symmetrical about a center line of the side edge.

10. The electronic device according to any one of claim 1, further comprising a second antenna, wherein:

the second antenna is arranged in the second body, and when the first body and the second body satisfy the position relationship, a microstrip line of the first antenna does not overlap with a microstrip line of the second antenna; or the second antenna is arranged in the first body, the feeding end of the first antenna and a feeding end of the second antenna are arranged at first conductive frames corresponding to different side edges of the first body.

* * * * *